(12) United States Patent
Lo et al.

(10) Patent No.: US 8,896,274 B2
(45) Date of Patent: Nov. 25, 2014

(54) CHARGER CALIBRATING DEVICE AND CALIBRATING METHOD THEREOF

(75) Inventors: Wei-Chun Lo, Miaoli (TW); Pei-Shin Chen, Zhubei (TW); Yueh-Chang Chen, Zhudong Township (TW); Chao-Tsung Tsai, Hsinchu (TW)

(73) Assignee: Altek Corporation, Hsinchu (TW)

( * ) Notice: Subject to any disclaimer, the term of this patent is extended or adjusted under 35 U.S.C. 154(b) by 595 days.

(21) Appl. No.: 13/338,823

(22) Filed: Dec. 28, 2011

(65) Prior Publication Data

US 2013/0082665 A1    Apr. 4, 2013

(30) Foreign Application Priority Data

Sep. 29, 2011   (TW) .............................. 100135178 A

(51) Int. Cl.
*H02J 7/00* (2006.01)

(52) U.S. Cl.
CPC . *H02J 7/00* (2013.01); *H02J 7/007* (2013.01); *H02J 2007/0059* (2013.01)
USPC ............ 320/164; 320/157; 320/159; 320/162

(58) Field of Classification Search
USPC ................................... 320/157, 159, 162, 164
See application file for complete search history.

(56) References Cited

U.S. PATENT DOCUMENTS

| | | | |
|---|---|---|---|
| 7,039,534 B1 * | 5/2006 | Ryno et al. ...................... | 702/63 |
| 2011/0226559 A1 * | 9/2011 | Chen et al. ..................... | 187/290 |
| 2011/0298425 A1 * | 12/2011 | Liu et al. ....................... | 320/118 |

* cited by examiner

*Primary Examiner* — Drew A Dunn
*Assistant Examiner* — Nathaniel Pelton
(74) *Attorney, Agent, or Firm* — Wang Law Firm, Inc.; Li K. Wang; Stephen Hsu

(57) ABSTRACT

A charger calibrating device and a calibrating method thereof. The device comprises a control module and a processing module. The control module controls a charger to be calibrated to perform a first stage charging and a second stage charging on an electronic device. The processing module performs an adjusting process according to the second stage charging time for adjusting the high level period of the PWM signal in the charging circuit of the charger. In the adjusting process, generating an updated high level period by adding or decreasing a preset adjusting amplitude, and decrease the preset adjusting amplitude by half to generate an updated adjusting amplitude. The processing module terminates the calibrating process after repeating the aforementioned calibrating loop a preset number of times.

18 Claims, 10 Drawing Sheets

| | Inductance of Transformer | Voltage of Battery (mV) | Second stage charging time of Method 1 (us) | Average second stage charging time of Method 1 (us) | Second stage charging time of Method 2 (us) | Average second stage charging time of Method 2 (us) |
|---|---|---|---|---|---|---|
| Method 1 | 12.41uH | 5.1V Power supply | 4400000 | 4701234 | N/A | N/A |
| Method 2 | 12.41uH | 5.1V Power supply | N/A | N/A | 747000 | 742565 |

FIG. 7A

| | Estimated high level period | Updated high level period | Calibrating time of Method 1 | Calibrating time of Method 2 | (Calibrating time of Method 1 / Calibrating time of Method 2)*100 |
|---|---|---|---|---|---|
| Method 1 | 325 | 325 | 5737231 | N/A | N/A |
| Method 2 | 325 | 325 | N/A | 1613854 | 28% |

CHARGER CALIBRATING DEVICE AND CALIBRATING METHOD THEREOF

CROSS-REFERENCE TO RELATED APPLICATION

This application claims the benefit of priority to Taiwan Patent Application No. 100135178, filed on Sep. 29, 2011, in the Taiwan Intellectual Property Office, the disclosure of which is incorporated in its entirety by reference.

BACKGROUND OF THE INVENTION

1. Field of the Invention

The present invention relates to a charger calibrating device, in particular to a digital flash lamp charger calibrating device and a calibrating method thereof with a lower cost and a higher efficiency.

2. Description of the Related Art

In digitals camera and digital camcorders, a flash lamp module is a necessary component, and a flash lamp circuit requires a charging capacitor to store energy in order to trigger an inert gas inside a lamp tube of a flash lamp to emit light. Such capacitor generally has a charging voltage up to 300 volts. To achieve a high voltage of over 300 volts for the capacitor voltage, the flash lamp circuit generally comes with a charging circuit to convert and supply the electric energy of a battery into the capacitor.

During the production process of a camera, a maximum flash lamp charging time is set to comply with a specific technical specification for all produced cameras, such that each camera has substantially the same charging time under the condition of the same voltage. In general, a flyback converter is usually used as the charging circuit of a camera.

With reference to FIG. 1 for a schematic circuit diagram of a charging circuit of a conventional flash lamp charger, the flyback converter 1 controls the ON/OFF of an n-type metal oxide semiconductor Q1 by a pulse width modulation (PWM) circuit P1 and charges a capacitor by an inductor in the circuit. If the PWM circuit P1 is situated in a high level period, a gate of the semiconductor Q1 is situated at a high level and an ON state for charging the inductor of a primary side $n_p$ of a transformer T1.

On the contrary, it is an OFF sate if the gate of the semiconductor Q1 is situated at a low level. At the same time, a secondary side $n_s$ of the transformer T1 will induce a current, and the current flows through a diode D1 to charge a capacitor C1, and the inductance of the primary side $n_p$ of the transformer will convert and transfer the energy stored at the gate of the semiconductor Q1 during in the high level period to the capacitor C1. Therefore, the voltage of the capacitor C1 can be charged to a level over 300 volts by continuous switching the semiconductor Q1.

However, hardware components have errors, such as the inductance of the primary side $n_p$ may have an error of +/−20%. Since the semiconductor Q1 is situated at the ON state, the current passing through the primary side $n_p$ will increase with time. The smaller the inductance, the faster is the rising current. On the contrary, the larger the inductance, the slower is the rising current. Therefore, the error of the inductance will affect the charging time of the flyback converter. To avoid the aforementioned situation, related manufacturers generally install a resistor R3 in the flyback converter, that monitoring and control the current passing through the primary side $n_p$ by a comparator CP1. When the current rises to a certain level, the resistor R3 will have a voltage value greater than threshold voltage value (Vth).

Now, the PWM circuit P1 turns off the semiconductor Q1 and terminates the continual charging of the inductor of the primary side $n_p$ to control the charging time of the capacitor C1.

This method requires additional resistor R3 and comparator CP1 installed in the circuit and incurs a higher cost. In addition, the resistor R3 will generate heat and lower the efficiency of the charger. Therefore, it is a main subject for the present invention to design a flash lamp charger calibrating device capable of lowering the manufacturing cost of the flash lamp charger, improving the charging efficiency, and enhancing the production capacity and yield rate of camera or camcorder products.

SUMMARY OF THE INVENTION

Therefore, it is a primary objective of the present invention is to overcome the shortcomings of the prior art by providing a charger calibrating device and a calibrating method thereof to achieve the effects of lowering the manufacturing cost, improving the charging efficiency, and enhancing the production capacity, yield rate and manufacturing labor and time of camera or camcorder products.

To achieve the aforementioned objective, the present invention provides a charger calibrating device, the charger calibrating device comprises a control module and a processing module. The control module is arranged for controlling a charger to be calibrated to execute a first stage charging and a second stage charging to an electronic device, and then controlling the electronic device to execute a discharging process. The processing module is arranged for executing an adjusting process to add or subtract a preset adjusting amplitude in a predetermined high level period of a switch in a charging circuit of the charger to be calibrated to generate an updated high level period if a second stage charging time is greater than or smaller than a typical charging time, and then producing an updated adjusting amplitude after the updated high level period is generated. The predetermined high level period and the preset adjusting amplitude are substituted by the updated high level period and the updated adjusting amplitude respectively, and terminate the calibrating process until the aforementioned calibrating loop is repeated for a predetermined number of times.

To achieve the aforementioned objective, the present invention further provides a charger calibrating method, comprising the steps of: using a control module to control a charger to be calibrated to execute a first stage charging and a second stage charging to an electronic device; using the control module to control the electronic device to execute a discharging process; Executing an adjusting process by the processing module if a second stage charging time is greater than or smaller than a typical charging time, and adding or subtracting the predetermined high level period from a preset adjusting amplitude in a predetermined high level period of a switch in a charging circuit of the charger to be calibrated to generate an updated high level period, and then reducing the preset adjusting amplitude by half to generate an updated adjusting amplitude; using the processing module to substitute the predetermined high level period and the preset adjusting amplitude by the updated high level period and the updated adjusting amplitude respectively, and terminating the calibrating process when the aforementioned calibrating loop is repeated for a predetermined number of times.

In an embodiment, a determination module may be provided for terminating the calibrating process when an error condition or a termination condition occurs.

In an embodiment, a fine-tune module may be provided for determining whether the second stage charging time is matched with a fine-tune condition when the first calibrating loop is executed; executing a fine-tune procedure if the second stage charging time is matched with a fine-tune condition, and performing an adjusting process; executing a table lookup analysis procedure if the second stage charging time is not matched with a fine-tune condition, and performing an adjusting process.

In an embodiment, the fine-tune procedure may reduce the preset adjusting amplitude to generate a fine-tune adjustment amplitude to substitute the preset adjusting amplitude.

In an embodiment, the table lookup analysis procedure may be looking up an inductance of a transformer in a charging circuit and an estimated high level period by a table lookup according to the second stage charging time, and when entering into the adjusting process of a next calibrating loop, substitutes the updated high level period by the estimated high level period, and reducing the adjustment amplitude to substitute the updated adjusting amplitude at the same time.

In an embodiment, the discharging process may perform a full discharge or a partial discharge to an electronic device, wherein the voltage after the discharge is smaller than a first stage saturation voltage.

In an embodiment, the processing module may decrease the preset adjusting amplitude by half to generate an updated adjusting amplitude.

To achieve the objective, the present invention further provides a charger calibrating device, the charger calibrating device comprises a control means, an adjustment means and a repeated substitution means. The control means is arranged for controlling a charger to be calibrated to execute a first stage charging and a second stage charging to an electronic device, and controlling the electronic device to execute a discharging process. The adjustment means is arranged for adding or subtracting a preset adjusting amplitude in a predetermined high level period of a switch in a charging circuit of the charger to be calibrated to generate an updated high level period if a second stage charging time is greater or smaller than a typical charging time, and reducing the preset adjusting amplitude by half to generate an updated adjusting amplitude. The repeated substitution means is arranged for substituting the predetermined high level period and the preset adjusting amplitude by the updated high level period and the updated adjusting amplitude respectively, and terminating the calibrating process when the aforementioned calibrating loop is repeated for a predetermined number of times.

In an embodiment, a determination means may be provided for terminating the calibrating process when an error condition or a termination condition occurs.

In an embodiment, a fine-tune means may be provided for determining whether the second stage charging time is matched with a fine-tune condition when the first calibrating loop is executed; Executing a fine-tune procedure if the second stage charging time is matched with a fine-tune condition, and performing an adjusting process; executing a table lookup analysis procedure if the second stage charging time is not matched with a fine-tune condition, and performing an adjusting process.

In an embodiment, the adjustment means may decrease the preset adjusting amplitude by half to generate an updated adjusting amplitude.

In summary, the charger calibrating device and the calibrating method in accordance with the present invention have one or more of the following advantages:

(1) The charger calibrating device and calibrating method can execute the charger calibrating process efficiently without the need of installing any electronic device in the charger, so as to save the manufacturing cost of the charger.

(2) The charger calibrating device and calibrating method can execute the charger calibrating process quickly to reduce the production time of the electronic product effectively.

(3) The charger calibrating device and calibrating method can check any defect produced quickly during the production process of the electronic products, and calibrate the charger effectively, so as to improve the production capacity and the yield rate of the electronic products effectively.

BRIEF DESCRIPTION OF THE DRAWINGS

FIGS. 7A and 7B show a time comparison flowchart of a calibrating process of a charger calibrating device in accordance with a preferred embodiment of the present invention.

DESCRIPTION OF THE PREFERRED EMBODIMENTS

The technical characteristics of the charger calibrating device and calibrating method of the present invention become apparent with the detailed description of preferred embodiments and the illustration of related drawings as follows. It is noteworthy to point out that same symbols are used in the following preferred embodiments to represent respective elements.

The charger calibrating device and calibrating method of the present invention are applicable to various electronic devices such as digital cameras and digital camcorders. To make it easier to understand the technical characteristics of the present invention, a digital camera is used as an embodiment for illustrating the present invention, but the invention is not limited to digital cameras only.

Figure 1:
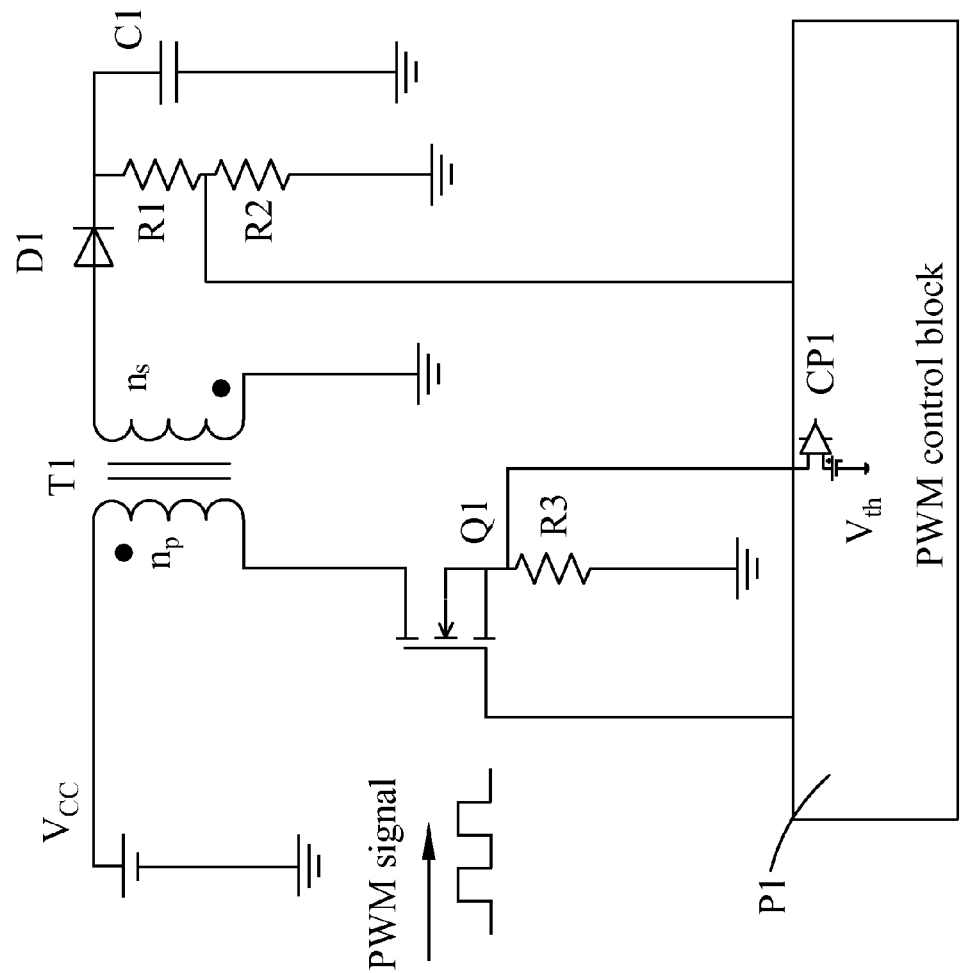
FIG. 1 is a schematic circuit diagram of a charging circuit of a conventional flash lamp charger.
Figure 2:
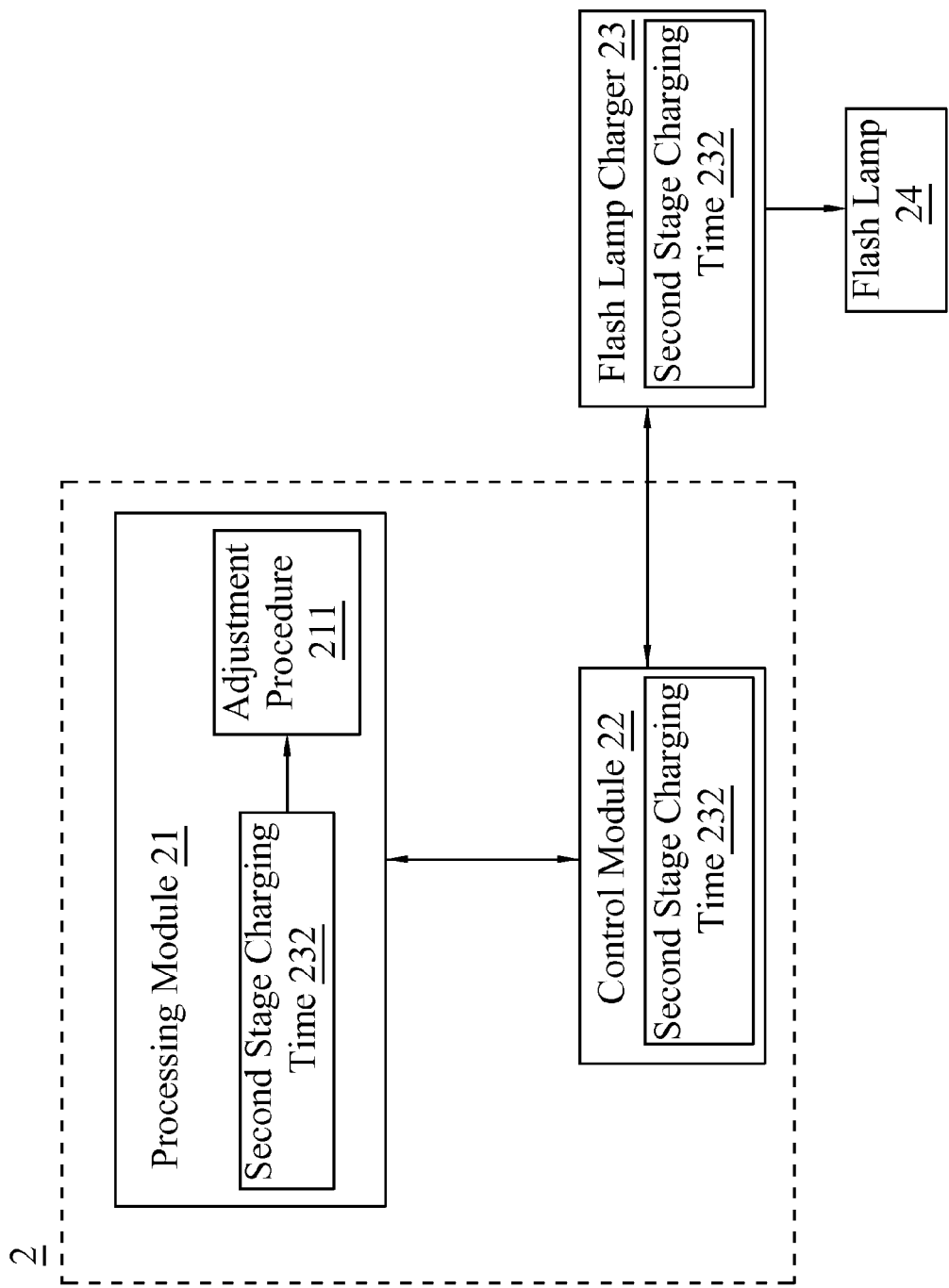
FIG. 2 is a block diagram of a charger calibrating device in accordance with a preferred embodiment of the present invention.

With reference to FIG. 2 for the block diagram of the charger calibrating device in accordance with the first preferred embodiment of the present invention, the flash lamp charger calibrating device 2 comprises the processing module 21 and the control module 22. Firstly, the processing module 21 executes an initial setup. Now, the flash lamp 24 has been discharged with the maximum amplitude, and the control module 22 will control the flash lamp charger 23 to charge the flash lamp 24. Wherein, the charging is performed by two stages. In the first stage charging, a voltage of approximately 60V for a full flash of the flash lamp is charged to a voltage of 100V. In the second stage charging, the voltage of 100V is charged to 320V. After the second stage charging is finished, the control module 22 will control the flash lamp 24 to execute a full-flash discharge, such that the voltage of the flash lamp 24 returns to a level of approximately 60V.

In an embodiment, it is noteworthy to point out that manufacturers will list the flash lamp charging time as one of the technical specifications during the production process of the cameras, and thus the defined charging time is the time required for charging a voltage (approximately equal to 60V) of a flash lamp after the discharge of a full flash to a saturation voltage of 320V. The saturation voltage is the voltage (300V) of flash lamp sufficient for a full flash plus a safety range (20V). However, the required voltage varies with different cameras, so that a charging range required by the first stage charging and the second stage charging may cover the voltage for a full flash of the flash lamp to the saturation voltage of a normal rated flash. Therefore, the overall charging time calibrating process may perform a calibration within a complete voltage range as required by the technical specifications.

In an embodiment, after the flash lamp 24 is discharged, the processing module 21 will start executing the adjusting process to compare the calculated second stage charging time 232 with the typical charging time. If the second stage charging time 232 is greater than typical charging time, it may show that the inductance of a primary side winding of a transformer in a charging circuit of the flash lamp charger 23 is greater than a standard value, and a longer time is required for storing energy, so that it is necessary to increase the high level period of the switch in the charging circuit, wherein the switch can be a pulse width modulation (PWM) circuit. Now, the processing module 21 adds a preset adjusting amplitude (Ton Offset) to a predetermined high level period (Old Ton) to generate an updated high level period (New Ton). On the contrary, if the second stage charging time 232 is smaller than the typical charging time, the processing module 21 will subtract the preset adjusting amplitude from the predetermined high level period to generate an updated high level period. However, the processing module 21 will reduce the preset adjusting amplitude by half to generate an updated adjusting amplitude. In the general situation, the processing module 21 will repeat the aforementioned calibrating loop for a predetermined number of times which can be generally six or seven times.

In an embodiment, the flash lamp charger calibrating device 2 of the present invention no longer needs additional resistor and comparator installed in the charging circuit to achieve the calibrating effect, so as to lower the manufacturing cost of the camera.

Figure 3:
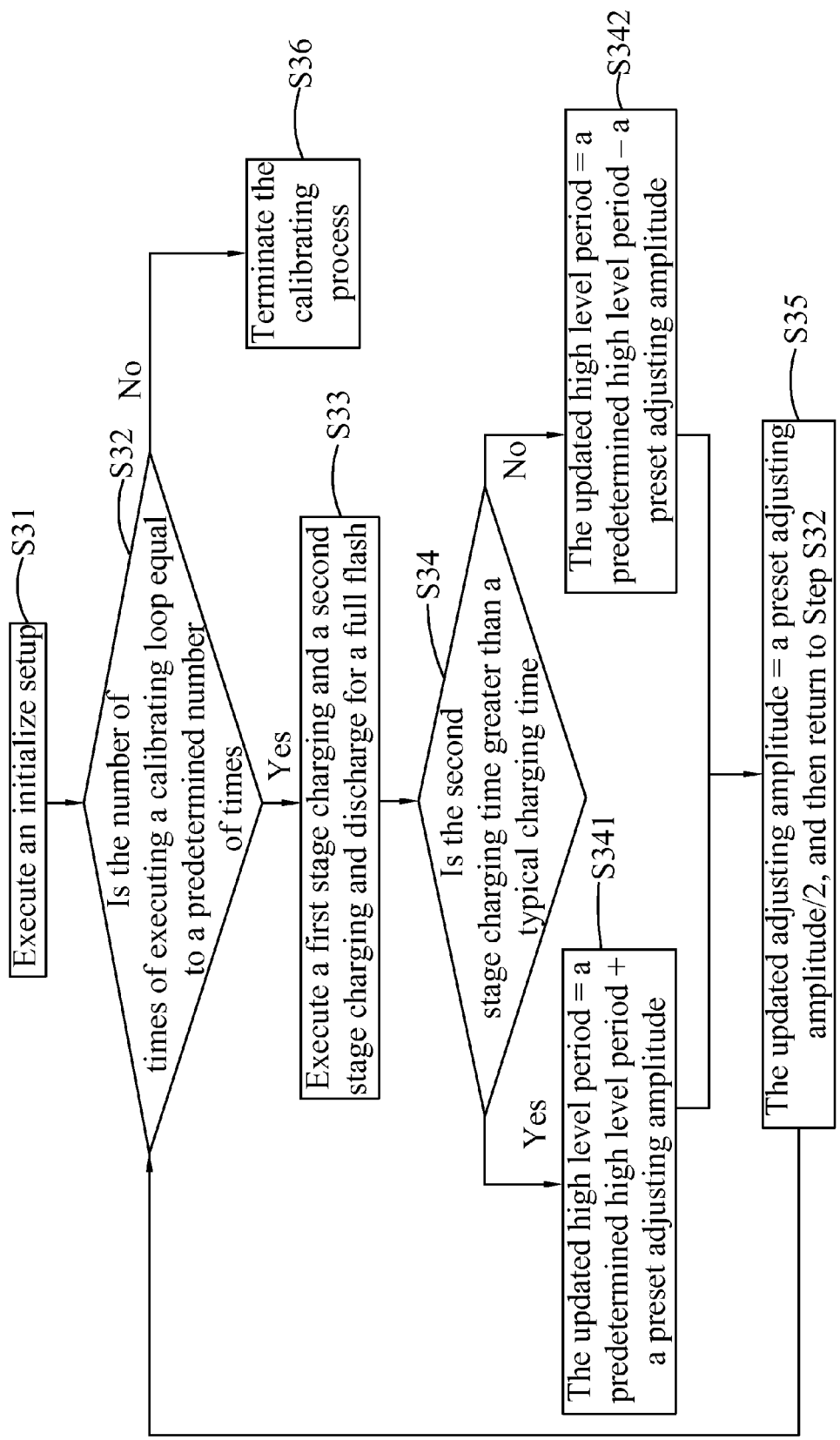
FIG. 3 is a flowchart of a charger calibrating device in accordance with a preferred embodiment of the present invention.

With reference to FIG. 3 for a flow chart of a charger calibrating device in accordance with the first preferred embodiment of the present invention, the operation comprises the following steps:

Step S31: Execute an initialize setup.

Step S32: Determine whether the number of times of executing a calibrating loop is equal to a predetermined number of times; if yes, then go to Step S36 and terminate the calibrating process, or else go to Step S33.

Step S33: Execute a first stage charging and a second stage charging, and then discharge for a full flash.

Step S34: Determine whether the second stage charging time is greater than a typical charging time; if yes, then go to Step S341, or else go to Step S342.

Step S341: Calculate an updated high level period, wherein the updated high level period=a predetermined high level period+a preset adjusting amplitude.

Step S342: Calculate an updated high level period, wherein the updated high level period=a predetermined high level period−a preset adjusting amplitude.

Step S35: Calculate an updated adjusting amplitude, wherein the updated adjusting amplitude=a preset adjusting amplitude/2, and then return to Step S32.

Figure 4:
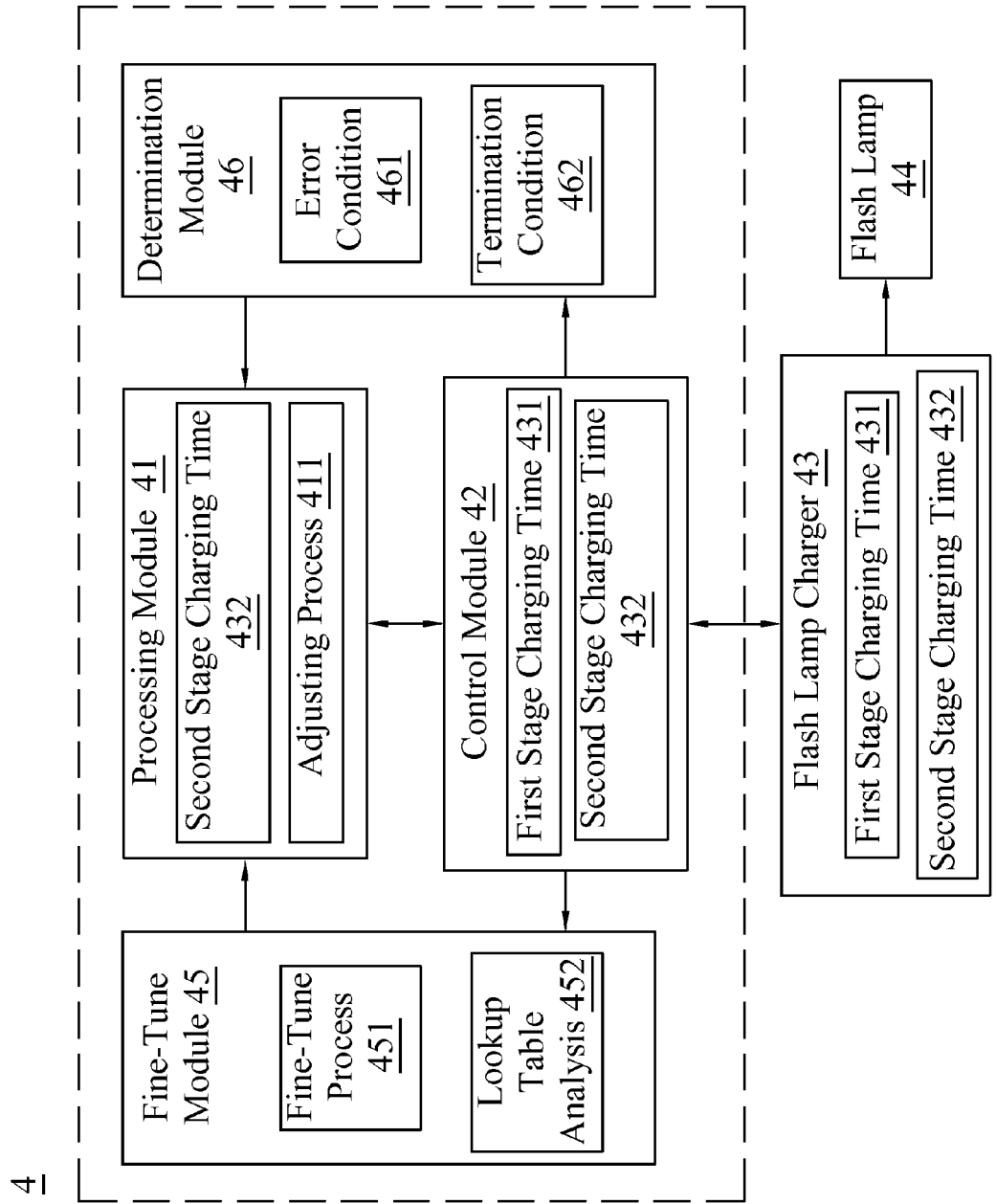
FIG. 4 is a block diagram of a charger calibrating device in accordance with a second preferred embodiment of the present invention.

With reference to FIG. 4 for a block diagram of a charger calibrating device in accordance with a second preferred embodiment of the present invention, the flash lamp charger calibrating device 4 of the present invention comprises a processing module 41, a control module 42, a fine-tune module 45 and a determination module 46. Similarly, the processing module 41 will execute an initial setup. The control module 42 will control a flash lamp charger 43 to perform a first stage charging and a second stage charging to a flash lamp 44 and control the flash lamp 44 to perform a partial discharge.

In an embodiment, it is noteworthy to point out that the discharge of the maximum amplitude no longer uses the full-flash for a flash lamp 44 in this preferred embodiment to achieve a higher efficiency of the flash lamp charger calibrating device 4. In the calibrating process of the first preferred embodiment, the range of calibrating the charging time is a second stage charging, which means need a voltage of 220V to charged in the voltage range of 100V~320V, so that it may take several seconds. In this preferred embodiment, the difference between the second stage saturation voltage and the first stage saturation voltage is maintained greater than 30V during the initial condition in order to reduce the charging time. In other words, approximately a voltage of 30V is charged in the second stage charging, and thus may improve the efficiency significantly.

In general, a digital camera requires a voltage of 250V for a normal flash, so that the second stage saturation voltage must be greater than 250V plus a safety range of 20V. Therefore, the second stage saturation voltage may be set to 270V, and the first stage saturation voltage may be set to 240V.

In an embodiment, it is noteworthy to point out that the full-flash may not use for discharge of the flash lamp 44 by calibrating the first and second stage saturation voltage. As long as the voltage is lower than the first stage saturation voltage after the flash lamp 44 is flashed, the first stage charging time 431 can be minimized as much as possible (which is the time required to charge the voltage after the flash lamp is flashed to the first stage saturation voltage). To avoid triggering an error condition (such as the first stage charging time 431 is smaller than the minimum first stage charging time), the first stage charging time 431 must be greater than the minimum first stage charging time plus some safety time to prevent errors of the charging time in the calibrating loop. On the other hand, the difference between the second stage saturation voltage and the first stage saturation voltage is preferably not smaller than 30V. If the difference is smaller than 30V, then the second stage charging time will have a too-small change, and a larger error may occur easily in the calibrating process.

The determination module 46 is provided for processing errors and terminating the calibrating process when the error condition 461 occurs, wherein the error condition 461 may comprise the following:

(1) The first stage charging time 431 is smaller than the minimum first stage charging time. Since the capacitor is discharged by the flash lamp 44, the voltage of the capacitor may not be able to discharge electricity due to an abnormal circuit of the flash lamp 44 or a damaged lamp tube, so that the first stage charging time 431 becomes very short. A product with problems can be found by setting a minimum first stage time, and the calibrating process is terminated immediately.

(2) The second stage charging time 432 is smaller than the minimum second stage charging time. Errors may occur in the components such as a transformer, an inductor, a capacitor and a resistor in the charging circuit, but such errors still fall within the manufacturer's specification. By assembling the component with the largest error in advance, the minimum second stage charging time is set, and the calibrating process is terminated immediately to avoid wasting too much time on the cameras with problems when the second stage charging time 432 is smaller than the minimum second stage charging time.

(3) The second stage charging time 432 is greater than the maximum second stage charging time for the same reason as given above.

(4) After the calibrating process is finished, the first stage charging time 431 plus the second stage charging time 432 is still greater than the maximum total charging time. In the calibrating process, the charging time cannot reach the typical charging time +/−5% due to the charging time error, or a minor hardware problem (such as a leaked capacitor), but the process has not exceeded the maximum and minimum of the second stage charging time. After the calibrating process is finished, the calibration is considered to be failed if the first stage charging time 431 plus the second stage charging time 432 is still greater than the maximum total charging time.

(5) A hardware charging protection error occurs during the first stage charging and second stage charging processes. The design of the digital flash lamp charger provides several hardware protection mechanisms. As long as the hardware protection mechanism is triggered during the first stage charging and second stage charging process, the calibrating process will be terminated immediately to avoid meaningless calibration on a camera with problems, so as to pick the camera with problems quickly.

(6) A software charging protection error occurs during the first stage charging or second stage charging process. The design of the digital flash lamp charger will enable the software charging protection for the charging during the calibrating process, so as to enhance the protection mechanism. As long as the charging protection mechanism is trigger during the charging process, the calibrating process will be terminated immediately to avoid continuous calibration of the camera with problems, so as to pick the camera with problems quickly.

In an embodiment, the determination module 46 may terminate the calibrating process when a termination condition 462 occurs, and such termination condition 462 may include the following:

(1) The second stage charging time 432 falls in a range of the typical charging time +/−5%, and the first stage charging time 431 plus the second stage charging time 432 is smaller than the maximum total charging time. Since there is an error of the charging time, the second stage charging time 432 falls within the range of the typical charging time +/−5% is acceptable. This condition may be used to make a camera with a charging time very close to the typical charging time and capable of finishing the calibrating process within the shortest time.

(2) After the calibrating process is finished, the first stage charging time 431 plus the second stage charging time 432 is smaller than the maximum total charging time. In the calibrating process, the second stage charging time 432 cannot falls within the typical charging time +/−5% due to the charging time error, but the process has not exceeded the maximum and minimum of the second stage charging time. To let this camera pass the calibrating process and considered as a camera that can finish the calibrating process successfully, as long as the final first stage charging time 431 plus the second stage charging time 432 is maintained smaller than the maximum total charging time.

In an embodiment, when the fine-tune module 45 executes the first calibrating loop, the adjusting process is accelerated, and a determination can be made to check whether or not the second stage charging time 432 is matched with a fine-tune condition, wherein the fine-tune condition may be set freely according to the actual situation. In this preferred embodiment, the fine-tune condition occurs, when the second stage charging time 432 reaches the typical charging time +/−(5%~8%). It shows that the second stage charging time 432 is very close to the typical charging time if the second stage charging time 432 is matched with the fine-tune condition, and the fine-tune procedure 451 is executed, and the preset adjusting amplitude is reduced (to 70 clocks in this preferred embodiment) to generate a fine-tune adjustment amplitude (which is one half of the preset adjusting amplitude in this preferred embodiment) to avoid a too-large adjustment, such that the calibrating loop has to be repeated for many times in order to calibrate too many errors at the first time. In other words, if the second stage charging time 432 falls within the typical charging time +/−(5%~8%), a smaller adjustment amplitude is used for performing the fine-tune directly without performing any coarse adjustment, so as to finish the calibrating process more quickly. After the fine-tune procedure 451 is finished, the table lookup analysis procedure 452 is performed.

In an embodiment, if f the second stage charging time 432 is not matched with the fine-tune condition, it shows that the second charging time 432 is very different from the typical charging time, and the table lookup analysis procedure 452 will be executed. The table lookup analysis procedure 452 uses the previously created table lookup to find the corresponding inductance and the estimated high level period according to the second stage charging time 432. In the next calibrating loop, when the processing module 41 executes the adjusting process 411, the estimated high level period is used directly, while using the reduced adjustment amplitude (which is equal to 15 clocks in this preferred embodiment) to make adjustments, and calibrate the errors of other circuit components to shorten the calibrating process.

In an embodiment, the processing module 41 executes the adjusting process 411. If the second stage charging time 432 is greater than the typical charging time and the fine-tune condition is matched, then the updated high level period=a predetermined high level period+a fine-tune adjustment amplitude. If the second stage charging time 432 is smaller than the typical charging time, and the fine-tune condition is matched, then the updated high level period=a predetermined high level period−a fine-tune adjustment amplitude. Finally, the processing module uses the reduced adjustment amplitude as the updated adjusting amplitude in the next calibrating loop according to the result of the table lookup analysis procedure 452 and repeats the aforementioned calibrating loop for a predetermined number of times or a termination condition is satisfied.

In an embodiment, if the second stage charging time 432 is greater than the typical charging time but the fine-tune condition is not matched, then the updated high level period=a predetermined high level period+a preset adjusting amplitude. If the second stage charging time 432 is smaller than the typical charging time and the fine-tune condition is not matched, the updated high level period=a predetermined high level period−a preset adjusting amplitude. In other words, if the second stage charging time 432 is not matched with the fine-tune condition, and then a coarse adjustment will still be executed in the first calibrating loop. Similarly, the processing module 41 uses the reduced adjustment amplitude as the updated adjusting amplitude for the next calibrating loop, and the aforementioned calibrating loop is repeated until a predetermined number of times or until a termination condition is satisfied.

In an embodiment, it is noteworthy to point out that regardless of whether the second stage charging time 432 is matched with the fine-tune condition, the results obtained from the table lookup analysis procedure 452 are used for the calculation when entering into the adjusting process 411 of the second calibrating loop, that the estimated high level period and the reduced adjustment amplitude to accelerating the calibrating process.

On the other hand, those ordinarily skilled in the art can combine each functional module into an integrated device, or separate each functional module into finer devices, or use different measures to achieve the same function and the same effect without departing from the spirit and the scope of the present invention.

Figure 5A:
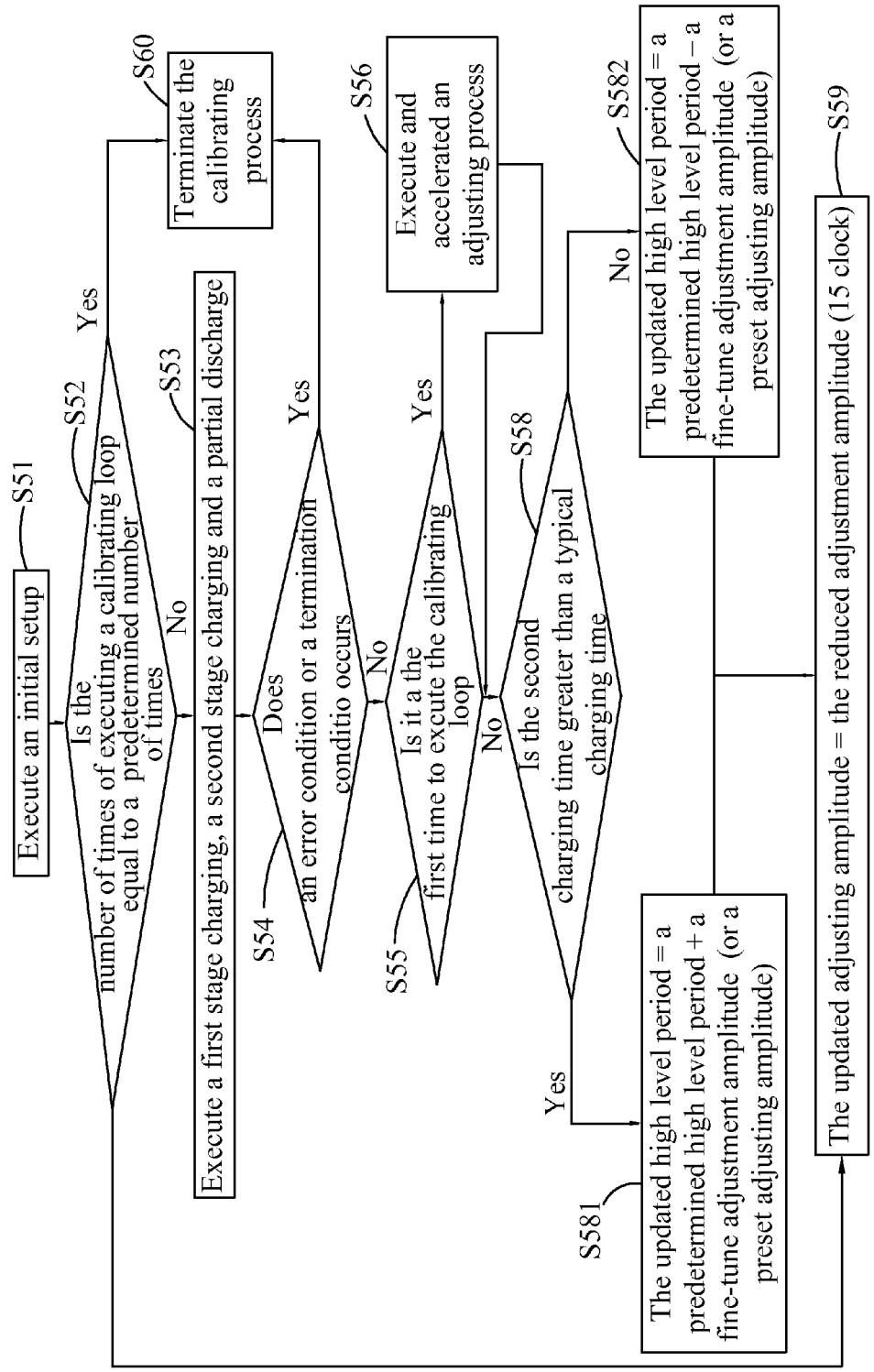
FIGS. 5A and 5B show a flow chart of a charger calibrating device in accordance with a second preferred embodiment of the present invention.
Figure 5B:
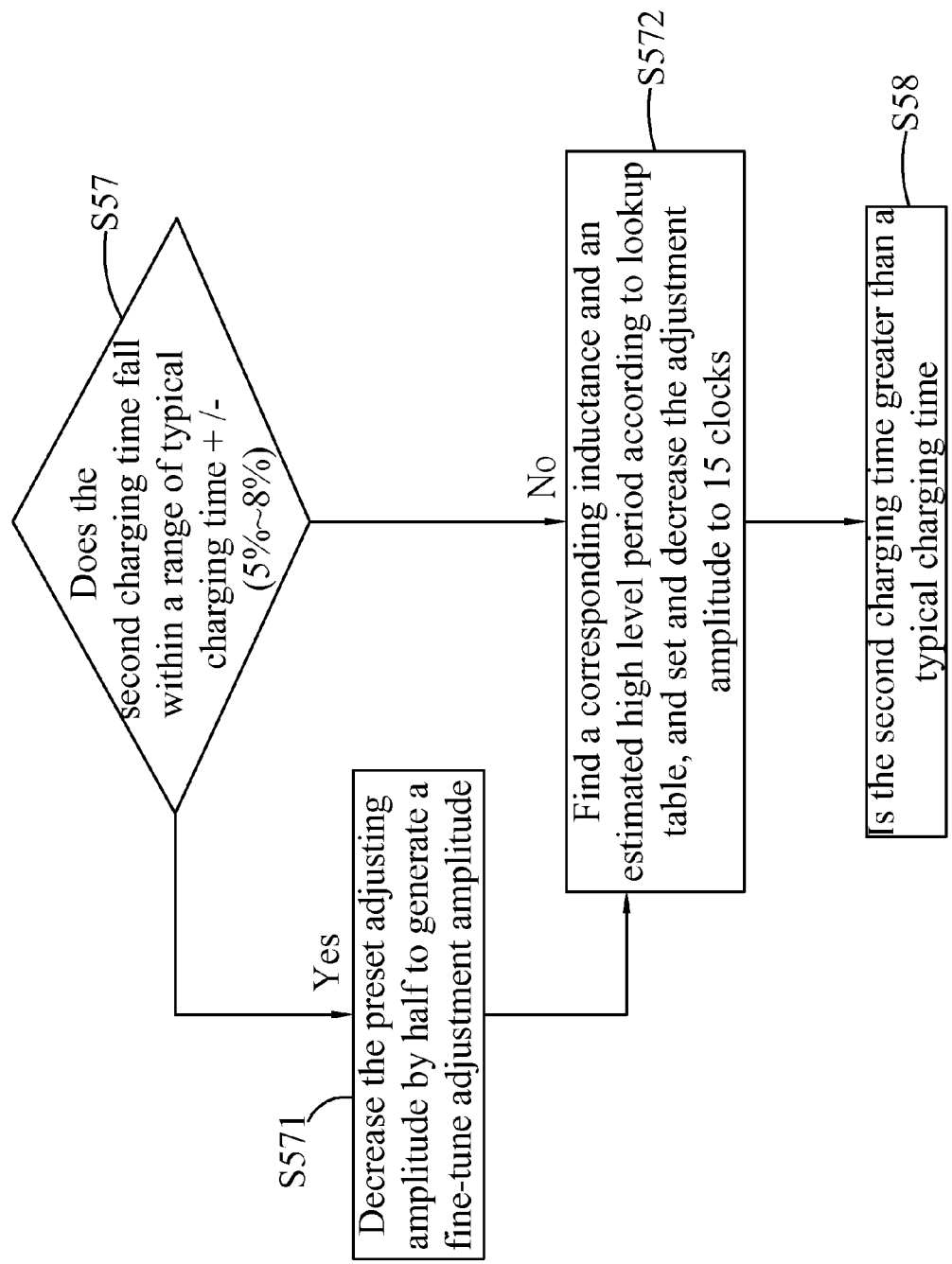

With reference to FIGS. 5A and 5B for a flowchart of a charger calibrating device in accordance with the second preferred embodiment of the present invention, the charger calibrating device executes a procedure comprising the following steps:

Step S51: Execute an initial setup.

Step S52: Determine whether the number of times of executing a calibrating loop is equal to a predetermined number of times; if yes, then go to Step S60 and terminate the calibrating process, or else go to Step S53.

Step S53: Execute a first stage charging, a second stage charging and a partial discharge.

Step S54: Determine whether an error condition or a termination condition occurs; if yes, then go to Step S60, or else go to Step S55.

Step S55: Determine whether it is the first time to execute the calibrating loop; if yes, then go to Step S56, or else go to Step S58.

Step S56: Execute an accelerated adjusting process.

Step S57: Determine whether the second charging time falls within a range of typical charging time +/−(5%~8%); if yes, then go to Step S571 and decrease the preset adjusting amplitude by half to generate a fine-tune adjustment amplitude and go to Step S572, or else go to Step S572 directly.

Step S 572: Find a corresponding inductance and an estimated high level period according to table lookup, and decrease the adjustment amplitude to 15 clocks, and go to Step S58.

Step S58: Determine whether the second charging time is greater than a typical charging time; if yes, then go to Step S581, or else go to Step S582.

Step S581: Calculate an updated high level period, wherein the updated high level period=a predetermined high level period+a fine-tune adjustment amplitude (or a preset adjusting amplitude).

Step S582: Calculate an updated high level period, wherein the updated high level period=a predetermined high level period−a fine-tune adjustment amplitude (or preset adjusting amplitude).

Step S59: Calculate an updated adjusting amplitude, wherein the updated adjusting amplitude=the reduced adjustment amplitude (15 clock), and return to Step S52.

Figure 6:
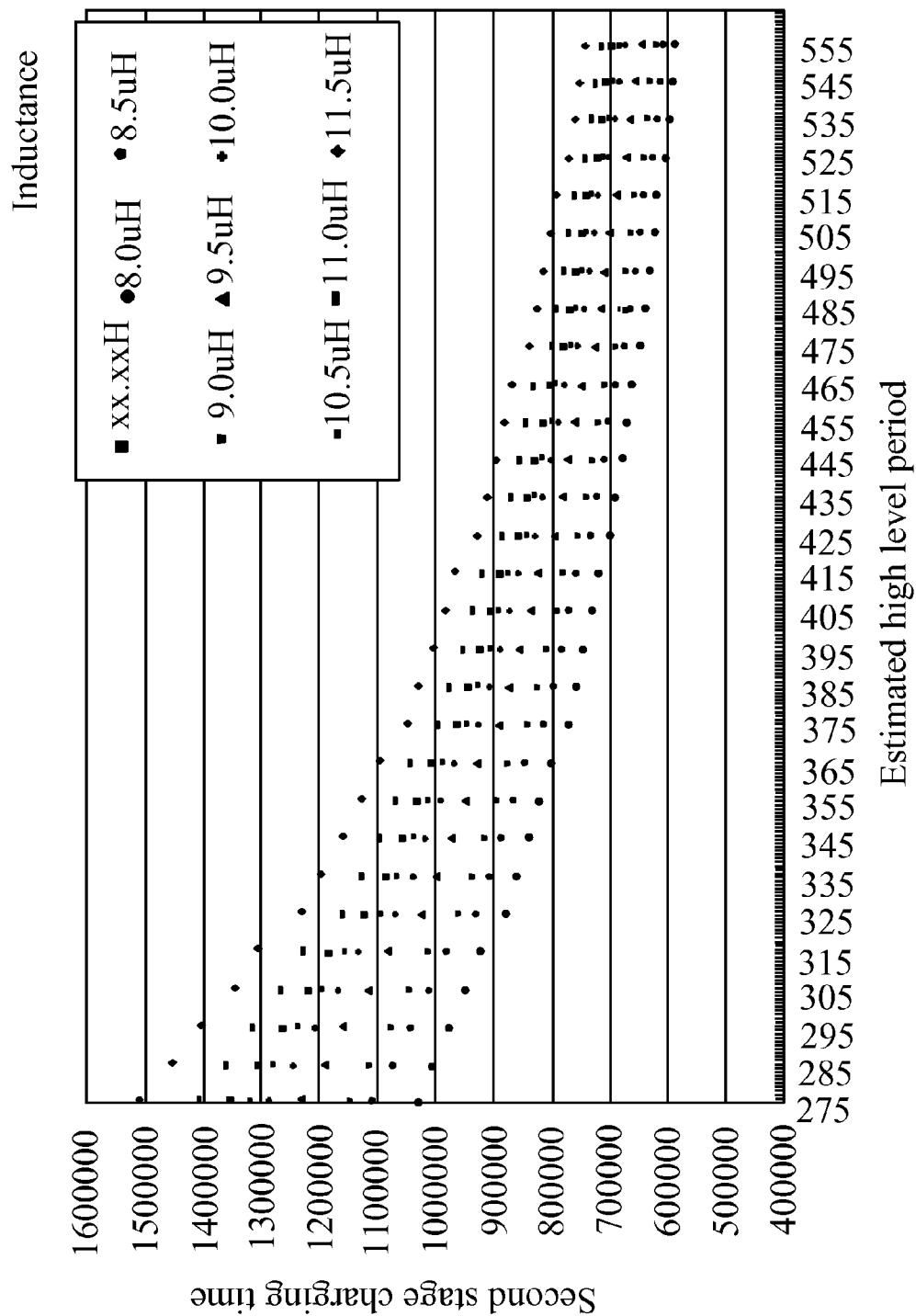
FIG. 6 is a table lookup of a charger calibrating device in accordance with a preferred embodiment of the present invention.

With reference to FIG. 6 for an example of a table lookup of a preferred embodiment of the present invention, the table lookup can be created by different methods. For example, a manufacturer provides each of all inductors within an error range for every 0.5 uH, and then observes a second stage charging time with the same voltage and the same high level period charging, and finally creates a timetable according to the calculated charging time of inductance of each inductor. For the inductance of each inductors with a difference of inductance of 0.5 uH (which is also smaller than 0.5 uH), an estimated high level period is calibrated, such that the second stage charging time is the closest to a designed typical charging time, and generated the estimated high level period of inductance of each inductors to create an estimated high level period table. Therefore, the high level period of a specific inductance of a inductor most suitable for a transformer can be found quickly without going through the calibrating loop for many times.

For example, the inductance of the transformer falls within a range of 10.5 uH~11.0 uH as shown in the figure of the measurement of the charging time of a transformer with unknown inductance (xx.xuH). If the typical charging time is equal to 850000 us, the table lookup shows that such transformer requires a high level period of 425 to achieve the charging time of approximately 850000 us.

With reference to FIGS. 7A and 7B for a time comparison flowchart of a calibrating process of a charger calibrating device in accordance with a preferred embodiment of the present invention, the method of this preferred embodiment is called Method 1 and the method of the second preferred embodiment is called Method 2 for the convenience of describing the invention. In Method 1, the second stage charging falls within a range from 100V to 320V. In Method 2, the second stage charging falls within a range from 240V to 270V, and this voltage can be adjusted to improve the calibrating efficiency significantly.

With reference to FIG. 7A, data shown in the figure are experiment results obtained from the same initial conditions such as the same camera model, the same inductance and the same power supply. The second stage charging time is equal to the set typical charging time, and the average second stage charging time is equal to the average measurement of the actual tests. In FIG. 7B, the predetermined high level period is equal to the updated high level period. In other words, both methods can finish the calibrating process in the first calibrating loop. Results of the figure obviously show that the time spent by Method 2 is only one-third of the time spent by Method 1. Therefore, the second stage charging time of Method 2 can be reduced and a partial discharging method can be adopted to improve the calibrating efficiency significantly.

Even though the concept of the charger calibrating method of the present invention has been described in the section of the charger calibrating device of the present invention, a flow chart is provided for the detailed description as follows.

Figure 8:
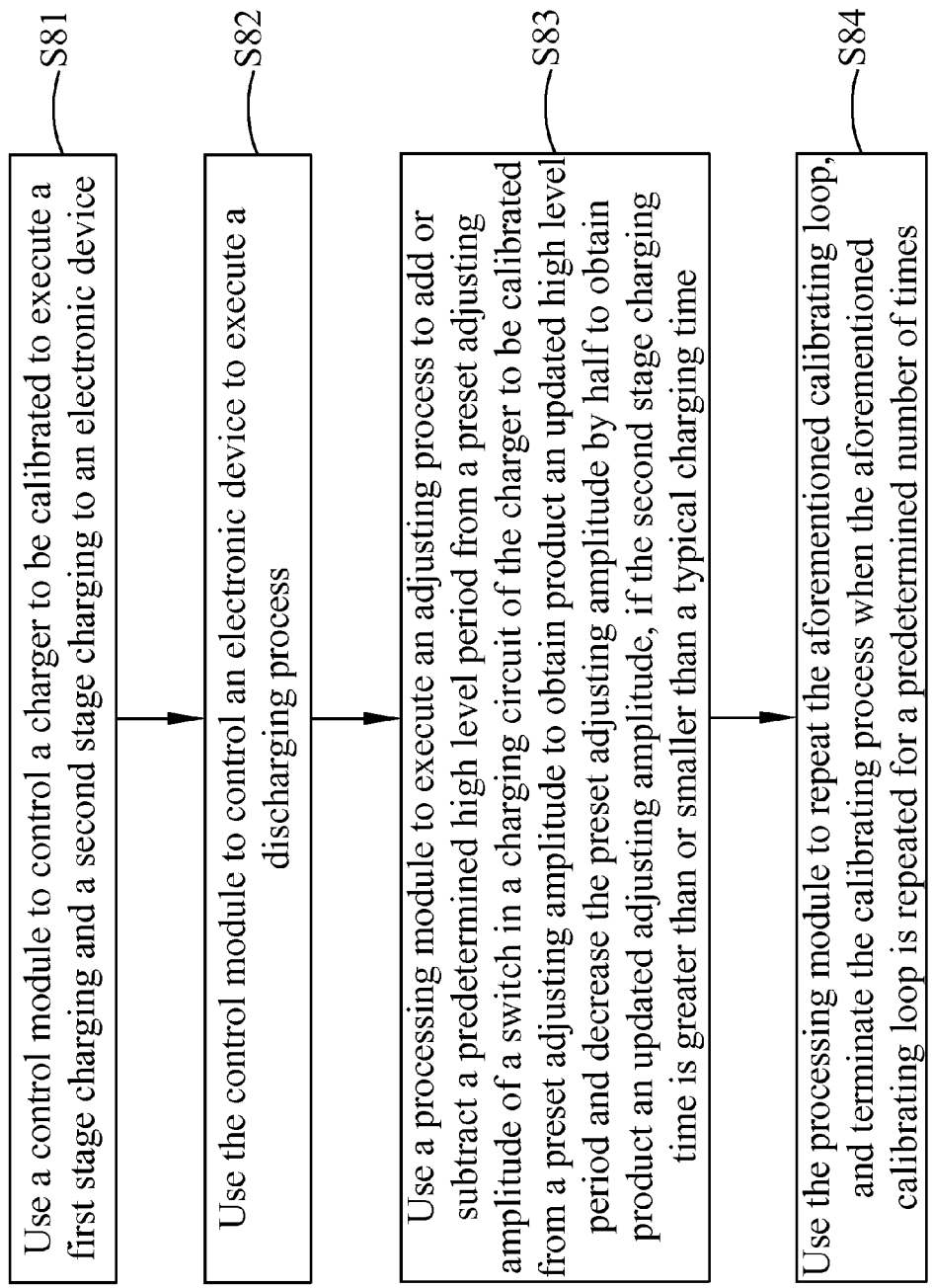
FIG. 8 is a flowchart of a charger calibrating method in accordance with a preferred embodiment of the present invention.

With reference to FIG. 8 for a flow chart of a charger calibrating method of the present invention, the charger calibrating method comprises the following steps:

Step S81: Use a control module to control a charger to be calibrated to execute a first stage charging and a second stage charging to an electronic device.

Step S82: Use the control module to control an electronic device to execute a discharging process.

Step S83: If the second stage charging time is greater than or smaller than a typical charging time, using a processing module to execute an adjusting process to add or subtract a predetermined high level period from a preset adjusting amplitude of a switch in a charging circuit of the charger to be calibrated to generate an updated high level period, and decrease the preset adjusting amplitude by half to generate an updated adjusting amplitude.

Step S84: Use the processing module to repeat the aforementioned calibrating loop, and terminate the calibrating process when the aforementioned calibrating loop is repeated for a predetermined number of times.

The detailed description and implementation of the calibrating method of the charger calibrating device in accordance with the present invention have been described above, and will not be described again.

In summary, the charger calibrating device and calibrating method of the present invention no longer needs any additional electronic device in the charging circuit to improve the calibrating efficiency and effect, so as to save the manufacturing cost of the charger. In addition, the charger calibrating device and calibrating method of the present invention can execute the charger calibrating process quickly to reduce the production time of the electronic product effectively and find any defect during the production process of the electronic product quickly to calibrate the charger effectively, so as to improve the production capacity and yield rate of the electronic product significantly. Obviously, the present invention can overcome the shortcomings of the prior art.

What is claimed is:

1. A charger calibrating device, comprising:
    a control module, arranged for controlling a charger to be calibrated to execute a first stage charging and a second stage charging to an electronic device, and then controlling the electronic device to execute a discharging process, and
    a processing module, arranged for executing an adjusting process to add or subtract a preset adjusting amplitude in a predetermined high level period of a switch in a charging circuit of the charger respectively when a second stage charging time is greater than or smaller than a typical charging time to generate an updated high level period and an updated adjusting amplitude, and then substitute the predetermined high level period and the preset adjusting amplitude by the updated high level period and the updated adjusting amplitude respectively, and then terminate calibration until a loop of the adjusting process is repeated for a predetermined number of times.

2. The charger calibrating device of claim 1, further comprising a determination module, arranged for terminating calibration if an error condition or a termination condition occurs.

3. The charger calibrating device of claim 1, further comprising a fine-tune module, arranged for determining whether the second stage charging time is matched with a fine-tune condition when a first calibrating loop is executed; if yes, then executing a fine-tune procedure and then performing the adjusting process, or else executing a table lookup analysis procedure and then performing the adjusting process.

4. The charger calibrating device of claim 3, wherein the fine-tune procedure decrease the preset adjusting amplitude to generate a fine-tune adjustment amplitude to substitute the preset adjusting amplitude.

5. The charger calibrating device of claim 3, wherein the table lookup analysis procedure looks up an inductance of an inductor stored in a corresponding charging circuit according to the second stage charging time and an estimated high level period by using a table lookup, and substitutes the updated high level period by the estimated high level period and the updated adjusting amplitude by a reduced adjustment amplitude when entering into the adjusting process of a next calibrating loop.

6. The charger calibrating device of claim 1, wherein the electronic device performs a full discharge or a partial discharge in the discharging process, and the voltage thereof is smaller than a first stage saturation voltage after the electronic device is discharged.

7. The charger calibrating device of claim 1, wherein the processing module decrease the preset adjusting amplitude by half to generate the updated adjusting amplitude.

8. A charger calibrating device, comprising:
    a control means, arranged for controlling a charger to be calibrated to execute a first stage charging and a second stage charging to an electronic device, and then controlling the electronic device to execute a discharging process;
    an adjustment means, arranged for adding or subtracting a predetermined high level period of a switch in a charging circuit of the charger to be calibrated from a preset adjusting amplitude to generate an updated high level period and an updated adjusting amplitude if a second stage charging time is greater than or smaller than a typical charging time; and
    a repeated substitution means, arranged for substituting the predetermined high level period and the preset adjusting amplitude by the updated high level period and the updated adjusting amplitude respectively, and terminating calibration when the aforementioned calibrating loop is repeated for a predetermined number of times.

9. The charger calibrating device of claim 8, further comprising a determination means for terminating calibration when an error condition or a termination condition occurs.

10. The charger calibrating device of claim 8, further comprising a fine-tune means for determining whether the second stage charging time is matched with a fine-tune condition when a first calibrating loop is executed; if yes, then executing a fine-tune procedure and then performing the adjusting process, or else executing a table lookup table lookup analysis procedure and then performing the adjusting process.

11. The charger calibrating device of claim 8, wherein the adjustment means decrease the preset adjusting amplitude by half to generate the updated adjusting amplitude.

12. A charger calibrating method, comprising the steps of:
    using a control module to control a charger to be calibrated to perform a first stage charging and a second stage charging to an electronic device;
    using the control module to control the electronic device to execute a discharging process;
    if a second stage charging time is greater than or smaller than a typical charging time, using a processing module to execute an adjusting process to add or subtract a predetermined high level period of a switch in a charging circuit of the charger to be calibrated from a preset adjusting amplitude to generate an updated high level period and an updated adjusting amplitude; and
    using the processing module to substitute the predetermined high level period and the preset adjusting amplitude by the updated high level period and the updated adjusting amplitude respectively, and then terminating calibration when the aforementioned calibrating loop is repeated for a predetermined number of times.

13. The charger calibrating method of claim 12, further comprising the step of:
    terminating calibration by a determination module, if an error condition or a termination condition occurs.

14. The charger calibrating method of claim 12, further comprising the steps of:
    determining whether the second stage charging time is matched with a fine-tune condition by a fine-tune module when a first calibrating loop is executed; if yes, then executing a fine-tune procedure and then performing the adjusting process, or else executing a table lookup analysis procedure and then performing the adjusting process.

15. The charger calibrating method of claim 14, wherein the fine-tune procedure reduces the preset adjusting amplitude to generate a fine-tune adjustment amplitude to substitute the preset adjusting amplitude.

16. The charger calibrating method of claim 14, wherein the table lookup table lookup analysis procedure looks up an inductance of an inductor stored in a corresponding charging circuit according to the second stage charging time and an estimated high level period by using a table lookup, and substitutes the updated high level period by the estimated high level period and the updated adjusting amplitude by a reduced adjustment amplitude when entering into the adjusting process of a next calibrating loop.

17. The charger calibrating method of claim 12, wherein the electronic device performs a full discharge or a partial discharge in the discharging processing, and the voltage is smaller than a first stage saturation voltage after the electronic device is discharged.

18. The charger calibrating method of claim 12, wherein the processing module decrease the preset adjusting amplitude by half to generate the updated adjusting amplitude.

\* \* \* \* \*